US012672177B2

(12) United States Patent
Yoshimoto

(10) Patent No.: US 12,672,177 B2
(45) Date of Patent: Jun. 30, 2026

(54) CONNECTION SETTING METHOD THAT IMPROVES CONVENIENCE OF CONNECTION TO NETWORK, INFORMATION PROCESSING APPARATUS, AND STORAGE MEDIUM

(71) Applicant: CANON KABUSHIKI KAISHA, Tokyo (JP)

(72) Inventor: Yuhei Yoshimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 344 days.

(21) Appl. No.: 18/484,509

(22) Filed: Oct. 11, 2023

(65) Prior Publication Data

US 2024/0129964 A1 Apr. 18, 2024

(30) Foreign Application Priority Data

Oct. 17, 2022 (JP) ................................. 2022-166328

(51) Int. Cl.
*H04W 76/10* (2018.01)
*G06F 3/12* (2006.01)
*H04W 84/12* (2009.01)

(52) U.S. Cl.
CPC ............ *H04W 76/10* (2018.02); *G06F 3/121* (2013.01); *G06F 3/1236* (2013.01); *G06F 3/1292* (2013.01); *H04W 84/12* (2013.01)

(58) Field of Classification Search
CPC ....... H04W 76/10; H04W 84/12; G06F 3/121; G06F 3/1236; G06F 3/1292
See application file for complete search history.

(56) References Cited

U.S. PATENT DOCUMENTS

| | | | | |
|---|---|---|---|---|
| 8,730,872 B2 * | 5/2014 | Elmaleh | ................ | H04W 4/023 |
| | | | | 370/335 |
| 9,104,355 B2 * | 8/2015 | Suzuki | .................. | G06F 3/1203 |
| 9,218,149 B2 * | 12/2015 | Mori | ...................... | G06F 3/1204 |
| 9,338,314 B2 * | 5/2016 | Kim | .......................... | G06F 9/54 |
| 9,501,136 B2 * | 11/2016 | Okamoto | .............. | G06F 1/3209 |
| 9,563,390 B2 * | 2/2017 | Suzuki | .................. | G06F 3/1284 |
| 9,883,059 B2 * | 1/2018 | Ishibashi | ............ | H04N 1/00411 |
| 10,365,871 B2 * | 7/2019 | Hattanda | ............ | H04N 1/00307 |
| 10,645,640 B2 * | 5/2020 | Suga | ...................... | H04W 8/005 |
| 11,838,859 B2 * | 12/2023 | Matsunaga | ........... | H04W 24/08 |

(Continued)

FOREIGN PATENT DOCUMENTS

| | | | | |
|---|---|---|---|---|
| CA | 3045069 A1 * | 6/2018 | ............. | H04L 49/90 |
| EP | 2713599 A2 * | 4/2014 | ......... | H04N 1/00217 |

(Continued)

*Primary Examiner* — Michael A Keller
(74) *Attorney, Agent, or Firm* — Venable LLP

(57) ABSTRACT

A connection setting method that improves the convenience of connection to a network. A method of controlling a terminal apparatus having a predetermined program includes determining, by the predetermined program which is operating as a background process, whether or not the terminal apparatus is in a predetermined state in which the terminal apparatus can access a predetermined peripheral device via a network of a base station to which the terminal apparatus is connected, and executing, based on a determination that the terminal apparatus is not in the predetermined state, predetermined processing to place the terminal apparatus in the predetermined state.

24 Claims, 9 Drawing Sheets

(56)　　　　　References Cited

U.S. PATENT DOCUMENTS

| | | | |
|---|---|---|---|
| 2001/0029531 A1* | 10/2001 | Ohta ..................... | G06F 3/1204 |
| | | | 455/3.06 |
| 2007/0294755 A1* | 12/2007 | Dadhia ................... | H04L 63/02 |
| | | | 726/11 |
| 2008/0158597 A1* | 7/2008 | Hashimoto .......... | G06F 21/608 |
| | | | 358/1.15 |
| 2010/0287288 A1* | 11/2010 | Driscoll ................ | H04W 12/06 |
| | | | 709/229 |
| 2012/0036403 A1* | 2/2012 | Nishiyama .......... | G06F 11/0733 |
| | | | 714/57 |
| 2012/0195295 A1* | 8/2012 | Elmaleh ................ | H04W 4/023 |
| | | | 370/338 |
| 2012/0263070 A1* | 10/2012 | Salomone ......... | H04W 52/0261 |
| | | | 370/252 |
| 2013/0081121 A1* | 3/2013 | Green ................... | H04L 9/0827 |
| | | | 726/7 |
| 2014/0085672 A1* | 3/2014 | Takaishi ............. | H04N 1/00307 |
| | | | 358/1.15 |
| 2014/0111821 A1* | 4/2014 | Seo .................... | H04N 1/00204 |
| | | | 358/1.13 |
| 2015/0036166 A1* | 2/2015 | Kadota ................ | G06Q 20/145 |
| | | | 358/1.14 |
| 2015/0185805 A1* | 7/2015 | Okamoto ............. | G06F 1/3209 |
| | | | 713/323 |
| 2016/0224290 A1* | 8/2016 | Suzuki .................. | G06F 3/1292 |
| 2018/0165042 A1* | 6/2018 | Ishida ................... | G06F 3/1236 |
| 2019/0044948 A1* | 2/2019 | Beals ................... | H04L 63/105 |
| 2019/0306365 A1* | 10/2019 | Takenaka .......... | H04N 1/32767 |
| 2020/0169953 A1* | 5/2020 | Sekiguchi ............... | H04L 63/00 |
| 2022/0374179 A1* | 11/2022 | Tsurumaki ........... | G06F 3/1288 |
| 2024/0103773 A1* | 3/2024 | Ohashi .................. | G06F 3/1204 |
| 2024/0251023 A1* | 7/2024 | Yamaguchi ............. | H04L 67/56 |
| 2024/0348494 A1* | 10/2024 | Mihira ................. | G06F 3/1203 |
| 2024/0414779 A1* | 12/2024 | Sekiguchi ........... | H04W 12/068 |
| 2024/0414780 A1* | 12/2024 | Sekiguchi ........ | H04M 1/72448 |
| 2025/0077140 A1* | 3/2025 | Ehara ................... | G06F 3/1292 |
| 2025/0106339 A1* | 3/2025 | Takaba ............... | H04L 63/0492 |

FOREIGN PATENT DOCUMENTS

| | | | | |
|---|---|---|---|---|
| JP | 2012-227786 A | | 11/2012 | |
| WO | WO-2024070555 A1 * | 4/2024 | ........... | H04W 16/10 |

* cited by examiner

Figure 1:
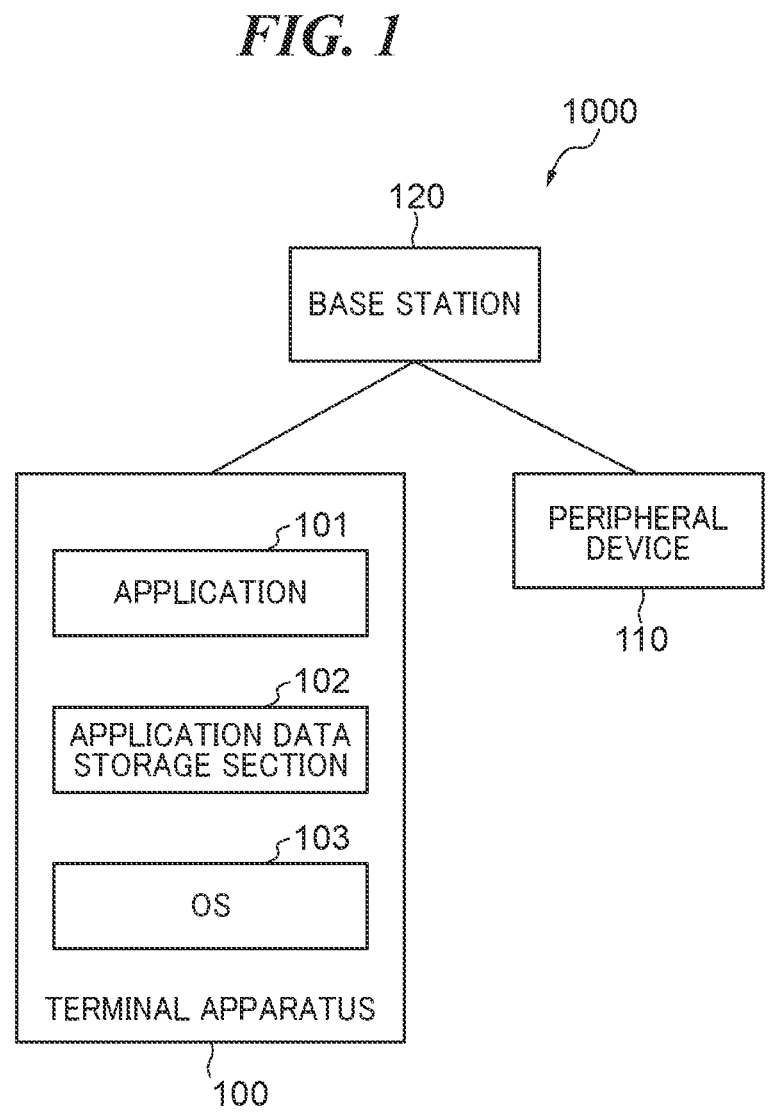

BASE STATION

101

APPLICATION

102

APPLICATION DATA
STORAGE SECTION

103

OS

TERMINAL APPARATUS

100

PERIPHERAL
DEVICE

110

CONNECTION SETTING METHOD THAT IMPROVES CONVENIENCE OF CONNECTION TO NETWORK, INFORMATION PROCESSING APPARATUS, AND STORAGE MEDIUM

BACKGROUND OF THE INVENTION

Field of the Invention

The present invention relates to a connection setting method that improves the convenience of connection to a network, an information processing apparatus, and a storage medium.

Description of the Related Art

Around a terminal apparatus, such as a personal computer, there are arranged peripheral devices that are connected to the terminal apparatus and made available. As the peripheral devices, for example, there are a lot of types of electronic devices, such as image processing apparatuses including, for example, a printer and a camera, smart devices including, for example, a smartphone and a personal computer, and home electrical appliances including, for example, a refrigerator and a water server. These peripheral devices are all connected to a wireless local area network (hereinafter referred to as the "wireless LAN") by an operation performed on the terminal apparatus, the peripheral device, or a base station (wireless router). Then, each peripheral device can be used by operating the terminal apparatus in this connection state. However, the peripheral device cannot receive an operation from the terminal apparatus in a state not connected to a suitable wireless LAN, and as a result, the peripheral device becomes unavailable. Japanese Laid-Open Patent Publication (Kokai) No. 2012-227786 discloses a configuration in which wireless connection is requested from a terminal apparatus to a peripheral device, and in a case where this connection fails, a reason why the wireless connection fails is detected.

Incidentally, as a terminal apparatus that can connect to a network comes into widespread use, there is an increasing demand for the improvement of the convenience of the terminal apparatus.

SUMMARY OF THE INVENTION

The present invention provides a connection setting method that improves the convenience of connection to a network, an information processing apparatus, and a storage medium.

In a first aspect of the present invention, there is provided a method of controlling a terminal apparatus having a predetermined program, including determining, using the predetermined program which is operating as a background process, whether or not the terminal apparatus is in a predetermined state in which the terminal apparatus can access a predetermined peripheral device via a network of a base station to which the terminal apparatus is connected, and executing, based on a determination that the terminal apparatus is not in the predetermined state, predetermined processing to place the terminal apparatus in the predetermined state.

In a second aspect of the present invention, there is provided a terminal apparatus having a predetermined program, including a determination unit configured to determine, using the predetermined program which is operating as a background process, whether or not the terminal apparatus is in a predetermined state in which the terminal apparatus can access a predetermined peripheral device via a network of a base station to which the terminal apparatus is connected, and an execution unit configured to execute, based on a determination that the terminal apparatus is not in the predetermined state, predetermined processing to place the terminal apparatus in the predetermined state.

According to the present invention, it is possible to improve the convenience of connection to a network by the information processing apparatus.

Further features of the present invention will become apparent from the following description of exemplary embodiments (with reference to the attached drawings).

BRIEF DESCRIPTION OF THE DRAWINGS

FIG. 1 is a block diagram showing the configuration of a system according to a first embodiment of the present invention.

DESCRIPTION OF THE EMBODIMENTS

Figure 2:
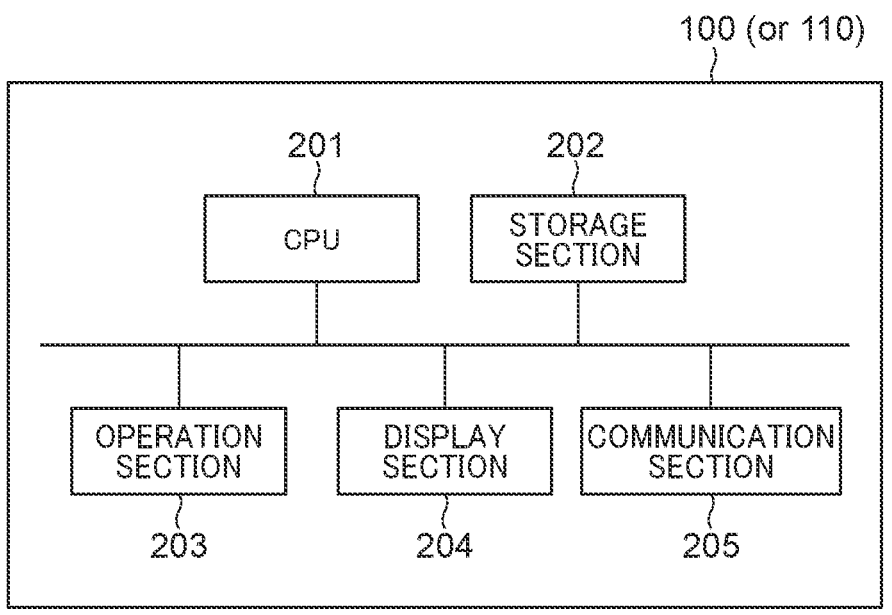
FIG. 2 is a block diagram showing a hardware configuration of a terminal apparatus and a peripheral device.

The present invention will now be described in detail below with reference to the accompanying drawings showing embodiments thereof. However, the component elements described in the following embodiments are described only by way of example, and are by no means intended to limit the scope of the present invention. For example, each component of the present invention can be replaced by a desired component which can perform the same function. Further, a desired component can be added. Further, two or more desired components (features) of the embodiments can be combined.

A first embodiment will be described below with reference to FIGS. 1 to 5. FIG. 1 is a block diagram showing the configuration of a system according to the first embodiment. The system shown in FIG. 1, denoted by reference numeral 1000, includes a terminal apparatus 100 as a first apparatus, a peripheral device 110 as a second apparatus, and a base station 120 communicably connected to the terminal apparatus 100 and the peripheral device 110. The terminal apparatus 100 is, for example, a personal computer. The terminal apparatus 100 has an application program (hereinafter referred to as the application) 101, an application data storage section 102, and an operating system (hereinafter referred to as the "OS") 103. The application 101 is an application program related to the peripheral device 110, and for example, the application 101 can display information on the peripheral device 110 and perform an operation on the peripheral device 110. The peripheral device 110 is, for example, a printer, a camera, a smart device, or a home electrical appliance. In a case where the peripheral device 110 has an operation section, the peripheral device 110 can be used by directly operating the operation section. Further, in a case where the peripheral device 110 is communicably connected with the terminal apparatus 100, the peripheral device 110 can be used by operating the peripheral device 110 via the terminal apparatus 100. The base station 120 is, for example, a router. The terminal apparatus 100 and the peripheral device 110 are wirelessly or wired connected to the base station 120.

FIG. 2 is a block diagram showing a hardware configuration of the terminal apparatus and the peripheral device. The terminal apparatus 100 and the peripheral device 110 have the same hardware configuration in the present embodiment, and hence the hardware configuration of the terminal apparatus 100 will be described as a representative. As shown in FIG. 2, the terminal apparatus 100 includes a central processing unit (CPU) 201, a storage section 202, an operation section 203, a display section 204, and a communication section 205. The CPU 201 can control the functional sections of the terminal apparatus 100 by executing the OS 103 and programs stored in the storage section 202. The storage section 202 includes a hard disk drive (HDD), a solid state drive (SSD), and a random access memory (RAM), for example. The storage section 202 stores, for example, application programs and data. The above-mentioned application 101 is stored in the storage section 202 and executed by the CPU 201. In the present embodiment, the terminal apparatus 100 is an information processing apparatus in which the application 101 has been installed in advance. The application 101 is configured to cause the OS 103 to execute an acquisition step, a comparison step, a determination step, and a processing step, described hereinafter, to perform connection setting (connection setting method) for enabling communication between the terminal apparatus 100 and the peripheral device 110. Further, the application data storage section 102 stores data in the storage section 202. The operation section 203 includes, for example, a keyboard, a pointing device (such as a computer mouse), and buttons. Further, the operation section 203 can have a touch panel arranged on the display section 204. The display section 204 includes, for example, a liquid crystal display. The communication section 205 includes, for example, a LAN card and a wireless LAN card.

Figure 3:
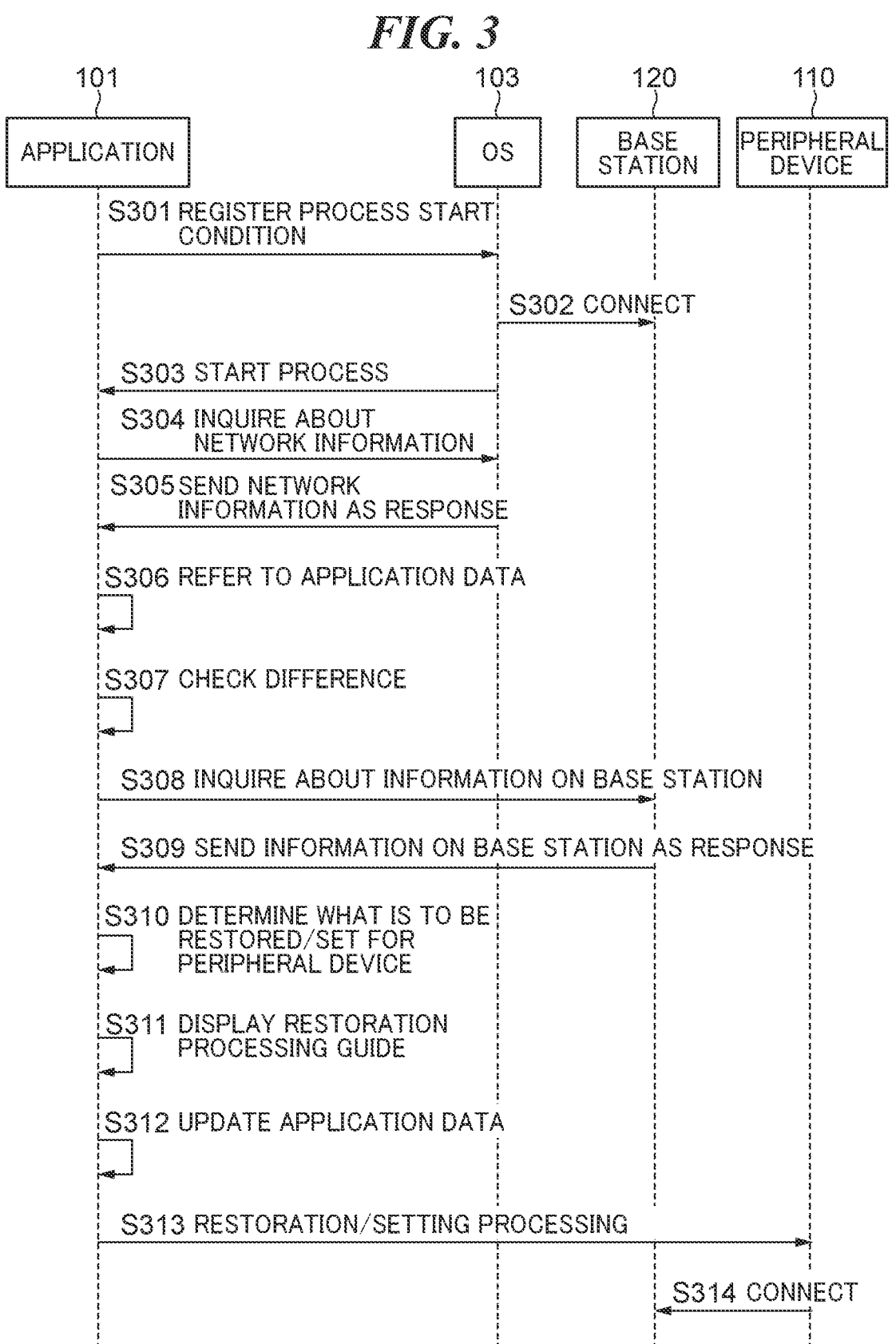
FIG. 3 is a sequence diagram showing an example of a process executed between an application, an OS, a base station, and the peripheral device.

FIG. 3 is a sequence diagram showing an example of a process executed between the application, the OS, the base station, and the peripheral device. As shown in FIG. 3, in a step S301, the application 101 of the terminal apparatus 100 registers a process start condition in the OS 103. This start condition is not particularly limited, but for example, any of a change in network connection settings of the OS 103 of the terminal apparatus 100, a change in the Internet availability of the terminal apparatus 100, a change in the active state of the terminal apparatus 100, and a change in the battery condition of the terminal apparatus 100 is used as the process start condition. Further, in a case where a predetermined time period elapses after the terminal apparatus 100 is started, the elapsed time can also be used as the process start condition.

In a step S302, the OS 103 of the terminal apparatus 100 is connected to the base station 120 by an operation of a user who uses the terminal apparatus 100.

In a step S303, when the process start condition registered in the step S301 is satisfied, the OS 103 starts network settings confirmation processing for confirming the network settings of the application 101. Although the network settings confirmation processing is started when the process start condition is satisfied in the present embodiment, this is not limitative, but for example, the application 101 can stay reside as a background process. In this case, the background process of the resident application 101 itself determines whether or not the process start condition is satisfied and starts the network settings confirmation processing. Further, the network settings confirmation processing can be executed by the application 101 activated in the foreground, when an execution instruction is received from a user. In this case, the network settings confirmation processing is started when the execution instruction is received from the user.

In a step S304, the application 101 inquires the OS 103 about information on the network to which the terminal apparatus 100 is currently connected.

In a step S305, the OS 103 sends the information on the network to which the terminal apparatus 100 is currently connected to the application 101 in response to the inquiry received in the step S304. With this, the application 101 can acquire the information on the network to which the terminal apparatus 100 is currently connected.

In a step S306, the application 101 refers to information on a network to which the terminal apparatus 100 was connected last time. This information is information stored in the application data storage section 102 by executing a step S312, described hereinafter.

In a step S307, the application 101 checks whether or not there is a difference between the information on the network, acquired in the step S305, and the information on the network connected last time, acquired in the step S306. Each network information includes, for example, a name of the wireless LAN (such as a service set identifier (SSID)) connected to the terminal apparatus 100 and information on a frequency band on which the wireless LAN operates.

In a step S308, the application 101 inquires the base station 120 about information on the base station 120.

In a step S309, the base station 120 transmits the information corresponding to the inquiry received in the step S308 to the application 101 as a response. With this, the application 101 can acquire the information in question. Note that this information is not particularly limited, but for example, this information is information on whether the network of the base station 120 is a public network or non-public network, information on whether or not another device is connected to the base station 120, and the like. Here, in a case where the information inquired about in the step S308 can be acquired in the preceding step S304, the steps S308 and S309 can be omitted.

In a step S310, the application 101 sets the network of the peripheral device 110 based on the information acquired in the steps S305 and S309 and the information stored in the application data storage section 102. Further, the application 101 determines what is to be restored/set by the network setting processing (hereinafter referred to as the "restoration/setting processing"). The restoration/setting processing is connection setting processing for connecting the terminal apparatus 100 and the peripheral device 110 to each other. Note that although what is to be restored/set by the restoration/setting processing are determined by the application 101, the restoration/setting processing can be executed by the application 101 or by a different application which can be executed from the application 101.

In a step S311, the application 101 displays a guide (message) for prompting a user to execute the restoration/setting processing, for example, to the user. The form of display of this guide is not particularly limited, but, for example, a screen which can be displayed by the application 101 or a notification which can be displayed by using the function of the OS 103 can be employed.

In the step S312, the application 101 updates and stores the information on the network to which the terminal apparatus 100 is connected, in the application data storage section 102.

In a step S313, the application 101 executes the restoration/setting processing for the peripheral device 110. This restoration/setting processing is executed when the user performs an operation on the guide displayed in the step S311. Note that although the restoration/setting processing is executed by using a user's operation as a trigger, this is not limitative, but for example, the user's operation can be omitted, and the processing can be automatically executed.

In a step S314, the peripheral device 110 connects to the base station 120 since the peripheral device 110 is made capable of connecting to the base station 120 by the restoration/setting processing executed in the step S313.

Figure 4:
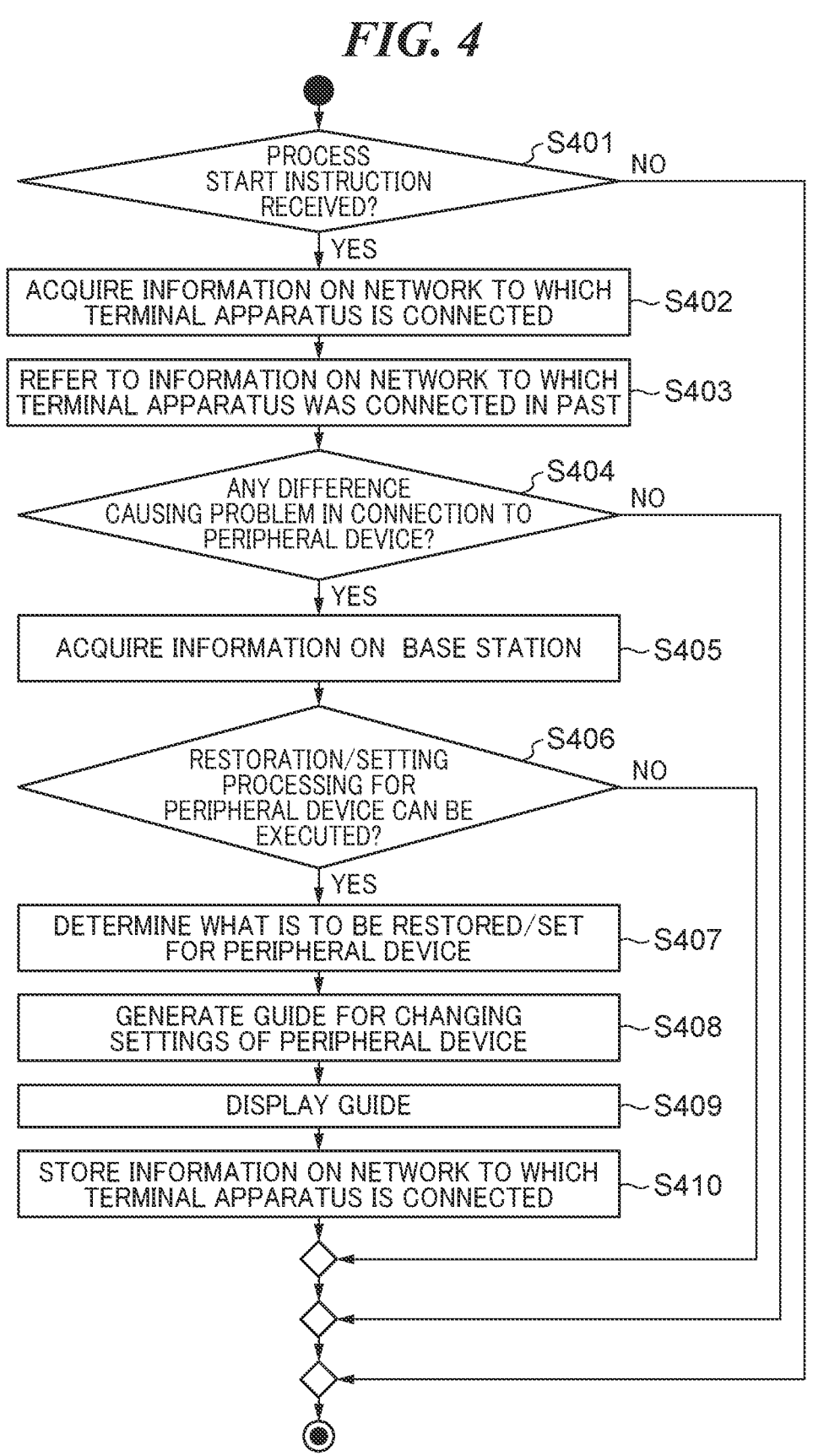
FIG. 4 is a flowchart (activity diagram) showing details of processing operations executed by the application, out of the processing operations in the sequence diagram shown in FIG. 3.

FIG. 4 is a flowchart (activity diagram) showing details of processing operations (process) executed by the application, out of the processing operations in the sequence diagram shown in FIG. 3. This process executed by the application 101 operates as a background process or as a foreground process in a case where the application 101 has been started. As shown in FIG. 4, in a step S401, the application 101 determines whether or not an instruction based on the above-mentioned process start condition has been received from the OS 103. If it is determined in the step S401 that the instruction has been received, the process proceeds to a step S402. On the other hand, if it is determined in the step S401 that the instruction has not been received, the present process is terminated. As mentioned above, in a case where the application 101 stays resident as the background process, the application 101 performs the determination on the process start condition, and if this condition is satisfied, the process can proceed to the step S402. Further, the process can also proceed to the step S402 when the application 101 is started or in a case where execution of a specific function is instructed from the application 101 by a user.

In the step S402, the application 101 acquires network information on the network to which the terminal apparatus 100 is currently connected (acquisition step). The network information is not particularly limited but includes, for example, a name (such as a service set identifier (SSID)) of the network, a frequency band of the network, and the like. Note that execution of the step S402 is started in a case where there occurs any one of a change in the network to which the terminal apparatus 100 is connected, a change in the position of the terminal apparatus 100, and a change in the operating state of the terminal apparatus 100. This makes it possible to prevent unnecessary execution of the step S402.

In a step S403, the application 101 refers to the information on the network to which the terminal apparatus 100 was connected last time, i.e. the network information having been acquired before acquisition of the network information acquired in the step S402 (acquisition step). This network information has already been stored in the application data storage section 102.

In a step S404, the application 101 compares the network information acquired in the step S402 and the network information referred to and acquired in the step S403 and determines whether or not there is a difference between these items of the network information (comparison step). Since the network information specifically includes, for example, an SSID, the application 101 compares the SSIDs of the respective items of the network information and determines whether or not there is a difference. If there is a difference between these SSIDs, this means that the network corresponding to the network information acquired in the step S402 and the network corresponding to the network information referred to and acquired in the step S403 are different from each other. That is, the network to which the terminal apparatus 100 was connected in the past and the network to which the terminal apparatus 100 is currently connected are different from each other. The application 101 determines, based on a result of this comparison, whether or not there is a difference which causes a problem when the terminal apparatus 100 is connected to the peripheral device 110. For example, in a case where the network to which the terminal apparatus 100 is connected has been changed, and the peripheral device 110 is not connected to an access point of the changed network, a problem in connection between the terminal apparatus 100 and the peripheral device 110 can be caused. In this case, it is considered that the peripheral device 110 cannot be detected or is difficult to be detected on the network to which the terminal apparatus 100 is connected. Then, as a result of this determination, if it is determined that there is a difference causing such a problem, the process proceeds to a step S405. On the other hand, if it is determined that there is no difference causing such a problem, the present process is immediately terminated.

In the step S405, the application 101 acquires information on the base station 120 (base station information acquisition step). This information on the base station 120 is not particularly limited, but, for example, this information includes, for example, information on whether the network of the base station 120 is a public network or non-public network, information on another device connected to the base station 120, and information on a device forming the base station 120. Note that the information on a device forming the base station 120 is information set by a management information base (hereinafter referred to as the "MIB") (e.g. installation place information). Further, in a case where the information on the base station 120 can be acquired in the step S402, the step S405 can be omitted.

In a step S406, the application 101 determines whether or not the restoration/setting processing can be executed for the peripheral device 110 based on the information acquired in the steps S402, S403 and S405 (connection setting determination step). If it is determined in the step S406 that the restoration/setting processing can be executed, the process proceeds to a step S407. On the other hand, if it is determined in the step S406 that the restoration/setting processing cannot be executed, for example, because the network of the base station 120 is a non-public network, the present process is immediately terminated.

In the step S407, the application 101 determines what is to be restored/set by the restoration/setting processing (determination step). Here, the restoration/setting processing is different depending on a state of the terminal apparatus 100 and the peripheral device 110. For example, let it be assumed that the peripheral device 110 was used by the terminal apparatus 100 via the base station 120 in the past. Further, let it be assumed that, in this state, the user has replaced the base station 120 with a new one, and then only the terminal apparatus 100, out of the terminal apparatus 100 and the peripheral device 110, has been connected to the new base station 120. In this case, since the peripheral device 110 is not connected to the base station 120, the terminal apparatus 100 cannot access the peripheral device 110. To properly perform the restoration/setting processing in this case, it is preferable that while maintaining the settings of the periph- eral device 110 (including a port number used for commu- nication) which are registered in the application 101 of the terminal apparatus 100, the peripheral device 110 is caused to be connected to the new base station 120. As a method of realizing this restoration/setting processing, for example, the following three methods can be employed: As the first method, the terminal apparatus 100 is temporarily and wirelessly connected to the peripheral device 110 using the peripheral device 110 as an access point to thereby pass information necessary for connecting the peripheral device 110 to the base station 120 from the terminal apparatus 100 to the peripheral device 110. As the second method, by directly operating the peripheral device 110, the method of connecting the peripheral device 110 to the base station 120 is instructed from the terminal apparatus 100. As the third method, the terminal apparatus 100 and the peripheral device 110 are temporarily wired connected to each other to thereby pass the information necessary for connecting the peripheral device 110 to the base station 120 from the terminal apparatus 100 to the peripheral device 110. By selecting and using one of these three methods, it is possible to make settings for the peripheral device 110 to connect to the new base station 120.

The cases where the restoration/setting processing is executed as described above include, for example, a case where there is a difference (different point) between the SSID included in the network information acquired in the step S402 and the SSID included in the past network information acquired in the step S403. Further, a case is also included where it is possible to determine, based on the information acquired in the step S405, that neither the peripheral device 110 which has been used so far nor another peripheral device 110 which can be used from the applica- tion 101 exists on the network of the base station 120.

Another example of the restoration/setting processing in the step S407 will be described. Let it be assumed, for example, that the terminal apparatus 100 is moved from the environment where the terminal apparatus 100 was used so far to another environment and is connected to a base station 120 of the other environment. In this case, the terminal apparatus 100 can access a new peripheral device 110 connected to the base station 120 of the other environment. However, the new peripheral device 110 has not been correctly registered in the application 101 of the terminal apparatus 100, and it can be difficult to make full use the function of the application 101. Here, whether or not the new peripheral device 110 has been correctly registered in the application 101 can be determined based on determination of whether or not a communication port used by the appli- cation 101 to communicate with the peripheral device 110 is set by the OS 103. To properly perform the restoration/ setting processing in this case, for example, while maintain the network state in which the terminal apparatus 100 is connected, the new peripheral device 110 is registered in the application 101 of the terminal apparatus 100.

The cases where the restoration/setting processing is executed as described above include, for example, a case where there is a difference between the SSID included in the network information acquired in the step S402 and the SSID included in the past network information acquired in the step S403. Further, a case is also included where it is possible to determine, based on the information acquired in the step S405, that a peripheral device 110 which is different from the peripheral device 110 which has been used so far exists on the network of the base station 120. Note that this different peripheral device 110 is limited to one compatible with and usable by the application 101. Further, a case is also included where the information acquired in the step S405 includes the MIB of the installation place set in the base station 120, and it is possible to determine that the infor- mation on the installation place of the current access point of the terminal apparatus 100 and the information on the installation place of the past access point of the terminal apparatus 100 are different from each other.

As described above, if it is determined in the step S404 that there is a difference, the step S407 is executed after sequentially executing the steps S405 and S406. On the other hand, if it is determined in the step S404 that there is no difference, the step S405 et seq. are omitted. In the step S407, in a case where it is determined in the step S406 that the restoration/setting processing can be executed, what is to be restored/set by the restoration/setting processing is deter- mined based on a result of the comparison in the step S404 and the information acquired in the step S405. The restora- tion/setting processing includes, for example, selecting and determining the new base station 120 to which the peripheral device 110 is to be connected. By thus executing the restoration/setting processing, it is possible to connect the terminal apparatus 100 and the peripheral device 110. Note that depending on a type of a result of the comparison in the step S404, even when the information on the base station 120 is omitted, it is possible to determine what is to be restored/set by the restoration/setting processing based on a result of the comparison in the step S404 and other infor- mation different from the information on the base station 120.

In a step S408, the application 101 generates a guide 500 that makes it possible to perform the restoration/setting processing for restoring and setting what is to be restored/ set, which is determined in the step S407. This guide 500 will be described hereinafter with reference to FIG. 5.

In a step S409, the application 101 displays the guide 500 generated in the step S408 on a screen of the display section 204 of the terminal apparatus 100 as a notification for prompting the user to perform the restoration/setting pro- cessing for restoring and setting what is to be restored/set (processing step).

In a step S410, the application 101 updates the network information which has already been stored and referred to in the step S403 to the network information newly acquired in the step S402 and stores the updated network information in the application data storage section 102 (storage step), followed by terminating the present process.

As described above, for example, in a case where there is a change in the information on the network to which the terminal apparatus 100 is connected, the application 101 can detect the change and prompt the user to execute the restoration/setting processing suitable for the network state at the detection timing. Then, by executing the restoration/ setting processing, it is possible to immediately shift the terminal apparatus 100 and the peripheral device 110 to a connection state communicable with each other. This makes it possible to operate the peripheral device 110 from the terminal apparatus 100. In the conventional technique, for example, in a case where the base station 120 is replaced, an application which can execute the network setting processing for the peripheral device 110 is selected, and in a case where the terminal apparatus 100 is used in a new environment, an application which can execute processing for registering the peripheral device 110 is selected. However, the application 101 makes it possible to reduce troublesomeness of such a connection operation (selection operation).

Further, as described above, the process of the application 101 operates as the background process, or as the foreground process in a case where the application 101 is being executed. That is, the application 101 executes, for example, the acquisition step, the comparison step, the determination step, and the processing step as the background process or as the foreground process regardless of whether or not an operation is performed on the terminal apparatus 100. With this, the steps S401 to S410 are immediately executed without being affected by the use state, operating state, or the like of the terminal apparatus 100.

Figure 5:
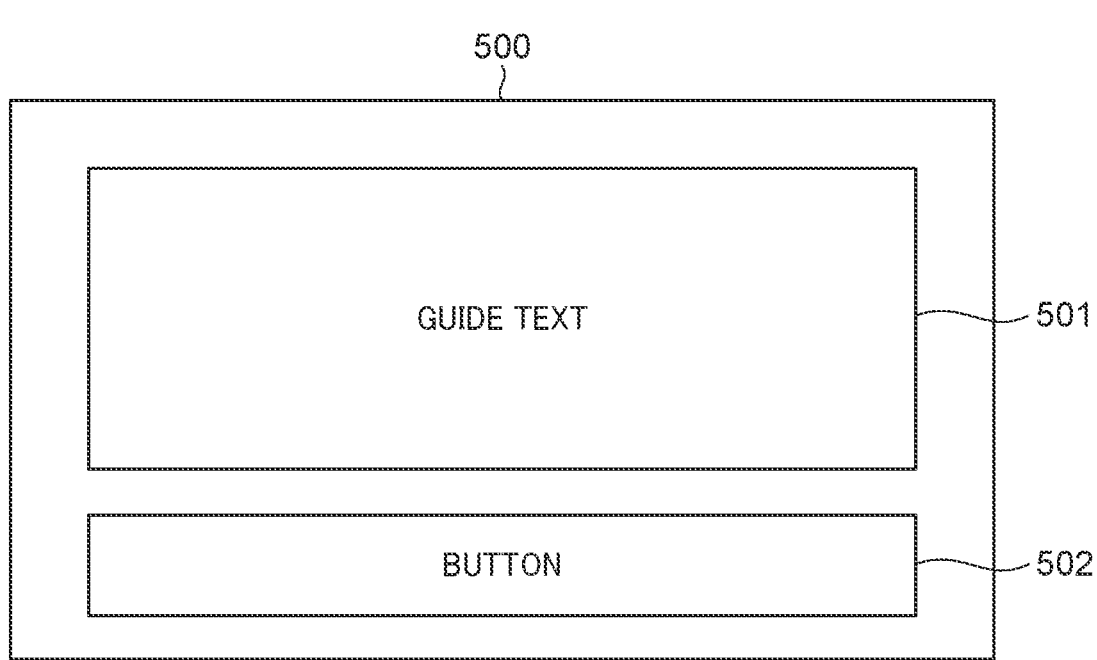
FIG. 5 is a diagram showing an example of an image generated by the application.

FIG. 5 is a diagram showing an example of an image generated by the application. The guide 500 shown in FIG. 5 is an image displayed on the display section 204 in the step S409. The guide 500 includes a guide text 501 and a button 502. The guide text 501 is a message (information) explaining the restoration/setting processing. This message is not particularly limited, but for example, a message "Do you connect the peripheral device to the base station to which the terminal apparatus is connected?" or a message "A new peripheral device is found. Do you register this peripheral device?" can be used. By confirming this message, the user is prompted to execute the restoration/setting processing. Note that the message can include not only characters, but also at least one of a symbol and a figure. The button 502 is an operation section on which an operation for executing the restoration/setting processing is performed. The user can press the button 502 after confirming the guide 500. With this operation, the restoration/setting processing is executed. Further, the guide 500 is not limited to the screen display, but for example, the guide 500 can use light emission using, for example, a signal lamp, or voice. Further, the guide 500 can be displayed by using a notification display function of the OS 103.

Note that although the step S409 is the step for displaying the guide 500, this is not limitative, but for example, the step S409 can be configured as a step of executing the restoration/setting processing determined in the step S407 in place of the step for displaying the guide 500. With this, it is possible to immediately execute the restoration/setting processing. In a case where the step S409 is configured as the restoration/setting processing execution step, the button 502 is omitted from the guide 500.

Next, a second embodiment will be described with reference to FIGS. 6 and 7, but the description will be given mainly of different points from the above-described embodiment, and description of the same points is omitted. In the first embodiment, the guide for execution of the restoration/setting processing is displayed by selecting the restoration/setting processing using the information on the network to which the terminal apparatus 100 was connected last time, which is stored in the application data storage section 102. After displaying this guide, in the application data storage section 102, the network information is updated to the information on the network to which the terminal apparatus 100 is currently connected. In such a configuration, the information stored in the application data storage section 102 is updated regardless of whether or not the peripheral device 110 is connected to a new network. Therefore, in a case where the user has not performed an operation on the guide for execution of the restoration/setting processing, the guide for execution of the restoration/setting processing is restricted (inhibited) from being displayed again. In view of this, in a configuration according to the present embodiment, the information on the network to which the peripheral device 110 has been connected is stored in the application data storage section 102 and is used for selection of the restoration/setting processing. Then, in a case where the restoration/setting processing is successful, the information stored in the application data storage section 102 is updated. This configuration and actions will be described in detail below.

Figure 6:
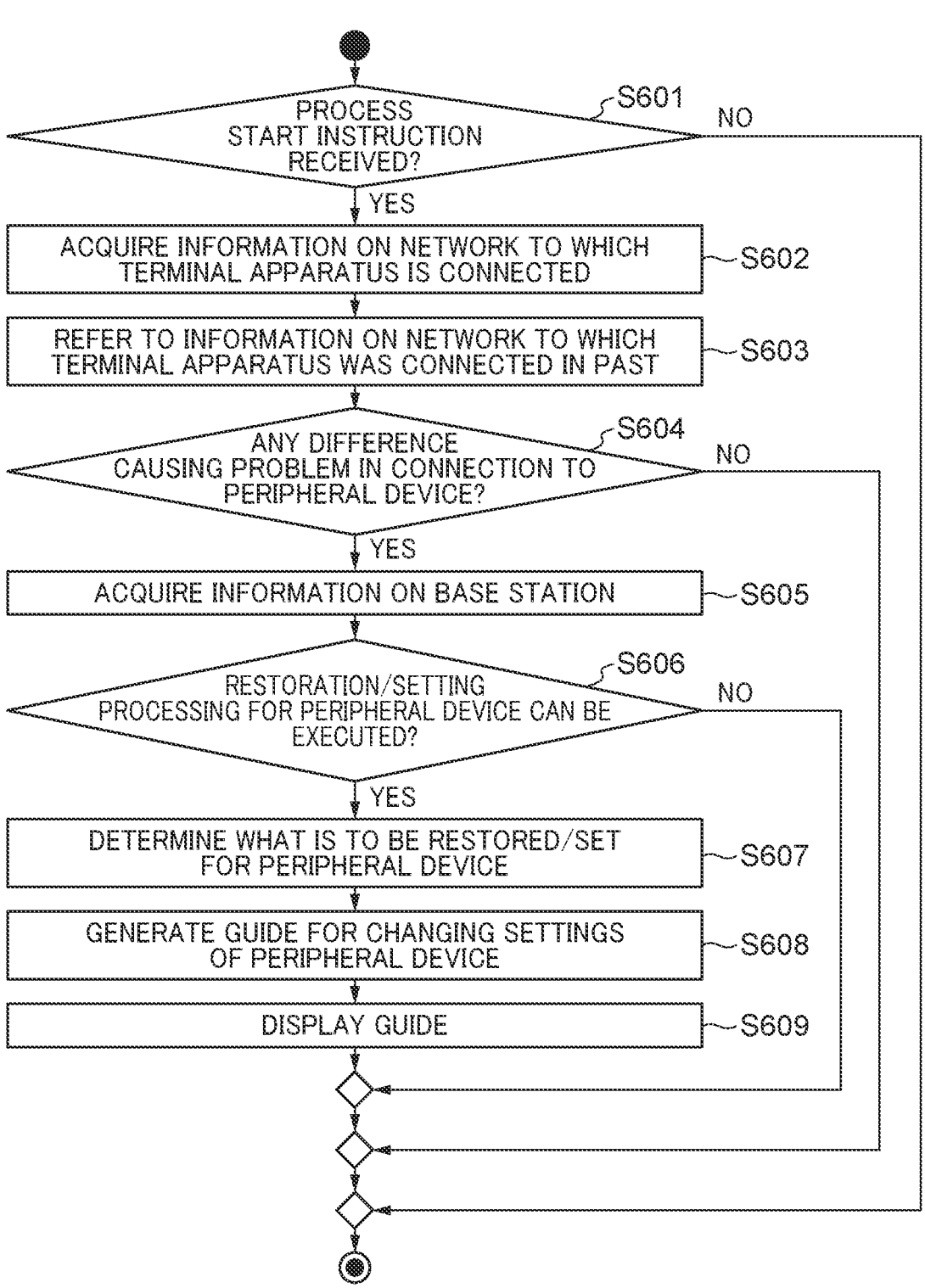
FIG. 6 is a flowchart (activity diagram) showing details of processing operations executed by the application, out of the processing operations in the sequence diagram shown in FIG. 3, in a second embodiment of the present invention.

FIG. 6 is a flowchart (activity diagram) showing details of processing operations executed in the second embodiment by the application, out of the processing operations in the sequence diagram shown in FIG. 3. As shown in FIG. 6, in a step S601, the application 101 determines whether or not an instruction based on the above-mentioned process start condition has been received from the OS 103. If it is determined in the step S601 that the instruction has been received, the process proceeds to a step S602. On the other hand, if it is determined in the step S601 that the instruction has not been received, the present process is terminated.

In the step S602, the application 101 acquires network information on the network to which the terminal apparatus 100 is connected.

In a step S603, the application 101 refers to the information on the network to which the terminal apparatus 100 was connected last time, which has already been stored in the application data storage section 102.

In a step S604, the application 101 compares the network information acquired in the step S602 and the network information acquired in the step S603 and determines whether or not there is a difference between these items of the network information. The application 101 determines whether or not there is a difference causing a problem when the terminal apparatus 100 is connected to the peripheral device 110. Then, as a result of this determination, if it is determined that there is a difference causing such a problem, the process proceeds to a step S605. On the other hand, if it is determined that there is no difference causing such a problem, the present process is terminated.

In the step S605, the application 101 acquires information on the base station 120. Note that in a case where the information on the base station 120 can be acquired in the step S602, the step S605 can be omitted.

In a step S606, the application 101 determines whether or not the restoration/setting processing can be executed for the peripheral device 110 based on the items of the information acquired in the steps S602, S603 and S605. If it is determined in the step S606 that the restoration/setting processing can be executed, the process proceeds to a step S607. On the other hand, if it is determined in the step S606 that the restoration/setting processing cannot be executed, the present process is terminated.

In the step S607, the application 101 determines what is to be restored by the restoration/setting processing. The restoration/setting processing includes setting the information on the network to which the terminal apparatus 100 is connected, in the peripheral device 110. What is to be restored by the restoration/setting processing, which is different from the above, includes registering a new peripheral device 110 on the network to which the terminal apparatus 100 is connected in the application 101 and thereby making the new peripheral device 110 operable from the terminal apparatus 100.

In a step S608, the application 101 generates the guide 500 for performing the restoration/setting processing for restoring and setting what is to be restored/set, which is determined in the step S607

In a step S609, the application 101 displays the guide 500 generated in the step S608 on the screen, followed by terminating the present process.

Figure 7:
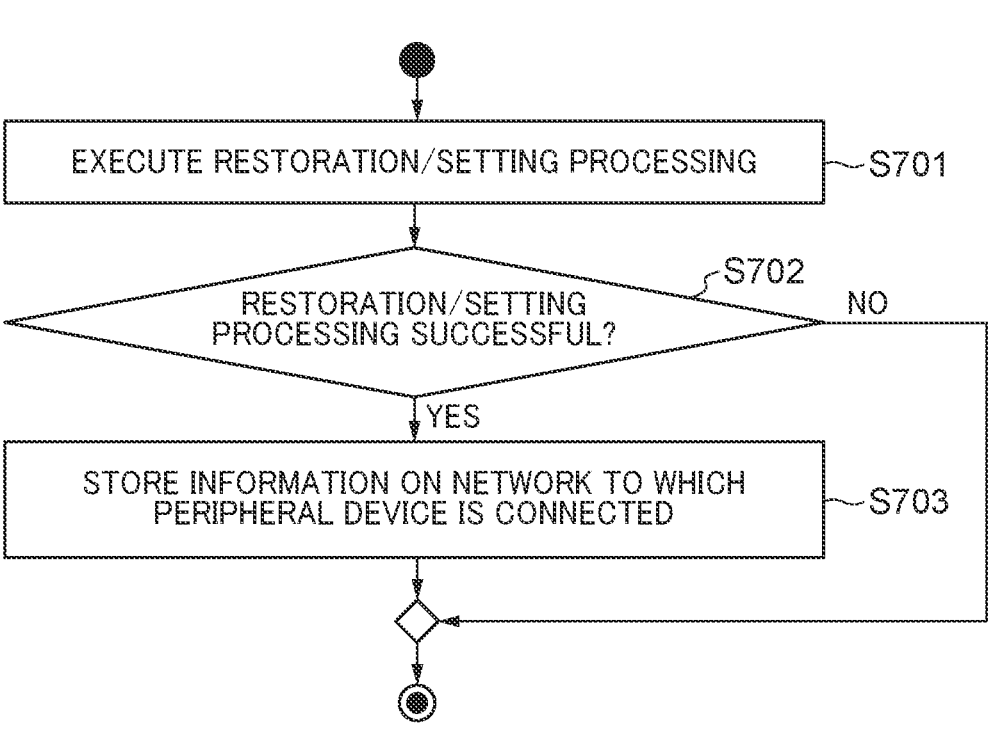
FIG. 7 is a flowchart of a process executed by the application from a step of executing restoration/setting processing to a step of updating information stored in an application data storage section.

FIG. 7 is a flowchart of a process executed by the application from a step of executing the restoration/setting processing to a step of updating the information stored in the application data storage section. As shown in FIG. 7, in a step S701, the application 101 executes the restoration/ setting processing. This restoration/setting processing is started when the user operates the button 502 on the guide 500 displayed in the step S609. Note that the trigger for starting the restoration/setting processing is not limited to the operation of the button 502, but for example, the restoration/setting processing can be automatically started after displaying the guide 500, by omitting the button 502. Further, the start setting of the restoration/setting processing can be set by the user in advance after the application 101 is started.

In a step S702, the application 101 determines whether or not the restoration/setting processing is successful, i.e. whether or not execution of the restoration/setting process-ing is completed (execution determination step). If it is determined in the step S702 that the restoration/setting processing is successful, i.e. execution of the restoration/ setting processing is completed, the process proceeds to a step S703. On the other hand, if the restoration/setting processing is not successful (has failed), i.e. execution of the restoration/setting processing is not completed, the present process is terminated.

In the step S703, the application 101 updates the infor-mation on the network to which the peripheral device 110 is connected, which is stored in the application data storage section 102, and stores the updated information (storage step), followed by terminating the present process.

As described above, in the present embodiment, the information stored in the application data storage section 102 is set to the information on the network to which the peripheral device 110 is connected, and only in a case where the restoration/setting processing is successful, the informa-tion can be updated. With this, even in a case where the user does not perform an operation on the guide for executing the restoration/setting processing, the guide for executing the restoration/setting processing can be displayed again at a predetermined time of the application 101. Further, it is also possible to prevent the user from forgetting to set the proper network information in the peripheral device 110.

Next, a third embodiment will be described with reference to FIG. 8, but the description will be given mainly of different points from the above-described embodiments, and description of the same points is omitted. In the first embodi-ment, the information on the network to which the terminal apparatus 100 is connected is used for selection of the restoration/setting processing, and the user is prompted to set the network settings for the peripheral device 110. However, in a case where the proper restoration/setting processing for the peripheral device 110 is selected only using the information on the network to which the terminal apparatus 100 is connected, the information used as the basis for determination (selection basis) can be insufficient. As such a case, there can be mentioned, for example, a case where the MIB of the installation place has not been installed in the base station 120, and it is difficult to acquire the information on the place. In view of this, the present embodiment has a configuration in which environmental information of the terminal apparatus 100, which can be acquired by the terminal apparatus 100, is acquired and used for selection of the restoration/setting processing executed for the peripheral device 110. This configuration and actions will be described in detail below.

Figure 8:
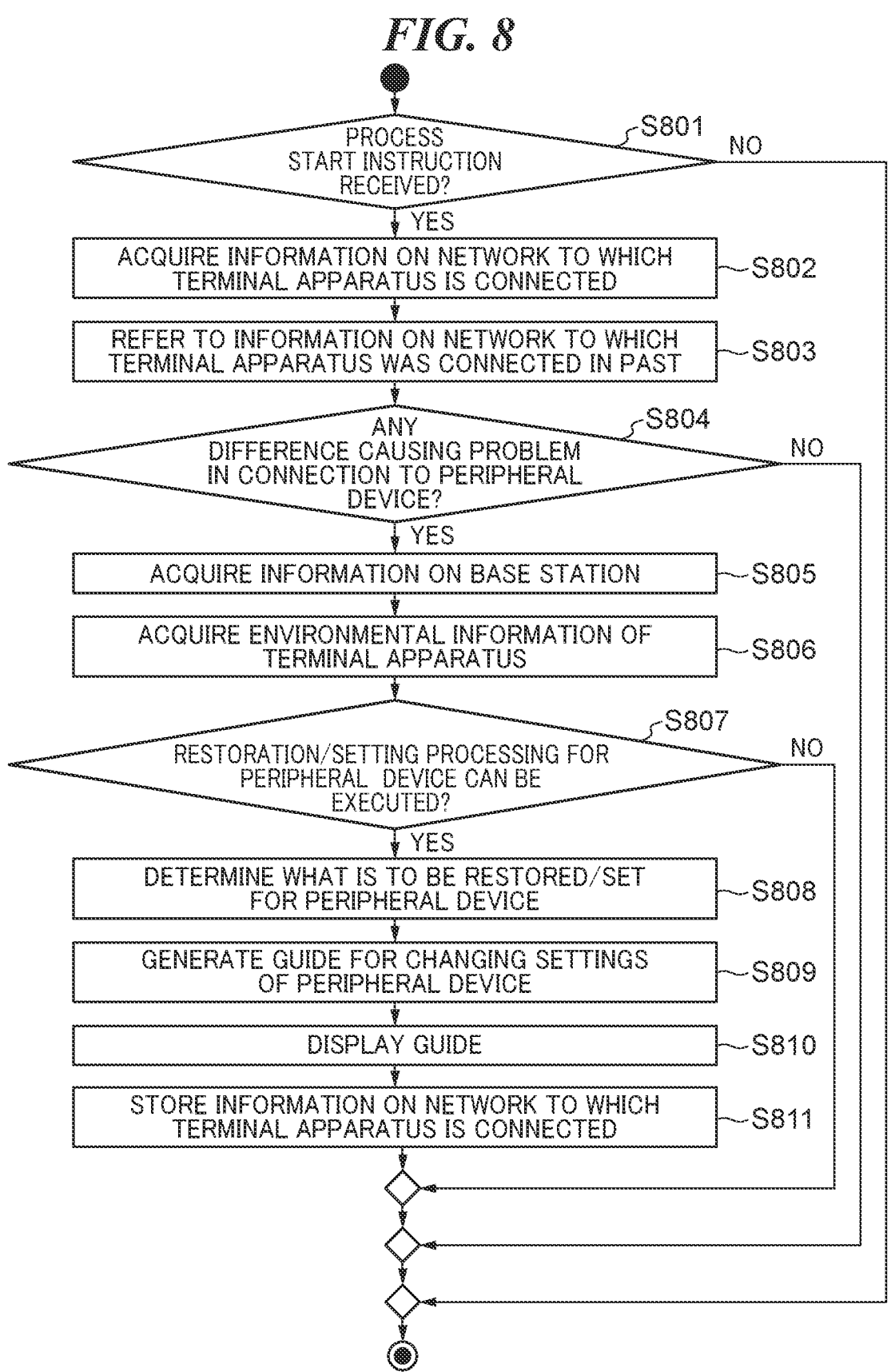
FIG. 8 is a flowchart (activity diagram) showing details of processing operations executed by the application, out of the processing operations in the sequence diagram shown in FIG. 3, in a third embodiment of the present invention.

FIG. 8 is a flowchart (activity diagram) showing details of processing operations executed in the third embodiment by the application, out of the processing operations in the sequence diagram shown in FIG. 3. As shown in FIG. 8, in a step S801, the application 101 determines whether or not an instruction based on the above-mentioned process start condition has been received from the OS 103. If it is determined in the step S801 that the instruction has been received, the process proceeds to a step S802. On the other hand, if it is determined in the step S801 that the instruction has not been received, the present process is terminated.

In the step S802, the application 101 acquires network information on the network to which the terminal apparatus 100 is connected.

In a step S803, the application 101 refers to the informa-tion on the network to which the terminal apparatus 100 was connected last time, which is already stored in the applica-tion data storage section 102.

In a step S804, the application 101 compares the network information acquired in the step S802 and the network information acquired in the step S803 and determines whether or not there is a difference between these items of the network information. The application 101 determines, based on a result of this comparison, whether or not there is a difference causing a problem when the terminal apparatus 100 is connected to the peripheral device 110. Then, as a result of this determination, if it is determined that there is a difference causing such a problem, the process proceeds to a step S805. On the other hand, if it is determined that there is no difference causing such a problem, the present process is terminated.

In the step S805, the application 101 acquires information on the base station 120. Note that in a case where the information on the base station 120 can be acquired in the step S802, the step S805 can be omitted.

In a step S806, the application 101 acquires environmen-tal information related to the use environment of the termi-nal apparatus 100 (environmental information acquisition step). As this environmental information, position informa-tion of the terminal apparatus 100 can be used, for example.

In a step S807, the application 101 determines whether or not the restoration/setting processing can be executed on the peripheral device 110, based on the information acquired in the steps S802, S803, S805, and S806. If it is determined in the step S807 that the restoration/setting processing can be executed, the process proceeds to a step S808. On the other hand, if it is determined in the step S807 that the restoration/ setting processing cannot be executed, the present process is terminated.

In the step S808, the application 101 determines what is to be restored/set by the restoration/setting processing. The restoration/setting processing includes, for example, in a case where there is no change in the position information of the terminal apparatus 100, setting the information on the network to which the terminal apparatus 100 is connected in the peripheral device 110. Further, the restoration/setting processing includes, in a case where it is determined based on a change in the position information of the terminal apparatus 100 that the terminal apparatus 100 is in a different use environment, registering a new peripheral device 110 on the network to which the terminal apparatus 100 is connected, in the application 101, and thereby making the new peripheral device 110 operable from the terminal apparatus 100.

In a step S809, the application 101 generates the guide 500 for performing the restoration/setting processing for restoring and setting what is to be restored/set, which is determined in the step S808.

In a step S810, the application 101 displays the guide 500 generated in the step S809 on the screen.

In a step S811, the application 101 updates the information on the network to which the terminal apparatus 100 is connected, which is stored in the application data storage section 102, followed by terminating the present process.

As described above, in the present embodiment, the environmental information on the terminal apparatus 100 can be used for determining what is to be restored/set by the restoration/setting processing. With this, even in a case where it is difficult to judge the use environment of the terminal apparatus 100 due to conditions, it is possible to guide the restoration/setting processing for restoring and setting what is to be restored/set, which is suitable for a use environment of the terminal apparatus 100.

Next, a fourth embodiment will be described with reference to FIG. 9, but the description will be given mainly of different points from the above-described embodiments, and description of the same points is omitted. In the first embodiment, the configuration is such that the information on the network to which the terminal apparatus 100 is connected is used for selection of the restoration/setting processing and the user is prompted to set the network settings for the peripheral device 110. However, in a case where the application 101 has a configuration in which a module for performing processing for determining what is to be restored/set by the restoration/setting processing and a module for executing the restoration/setting processing are separate modules, there can be caused a problem that in a case where the information acquired by the processing for determining what is to be restored/set by the restoration/setting processing is acquired by the restoration/setting processing again, this process becomes redundant. To solve this problem, the present embodiment has a configuration in which the application 101 passes the information acquired in the processing for determining what is to be restored/set by the restoration/setting processing to the restoration/setting processing. This configuration and actions will be described in detail below.

Figure 9:
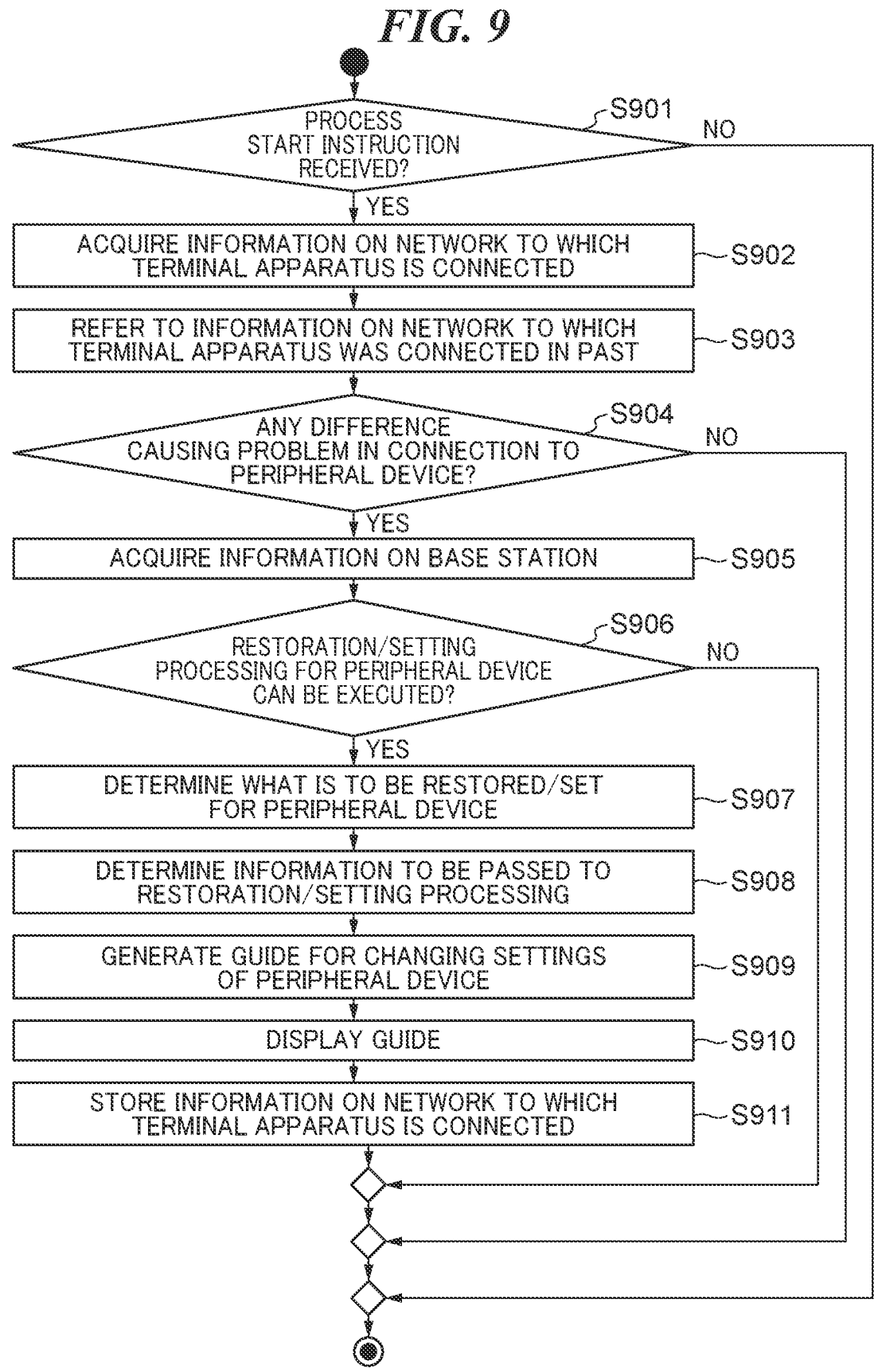
FIG. 9 is a flowchart (activity diagram) showing details of processing operations executed by the application, out of the processing operations in the sequence diagram shown in FIG. 3, in a fourth embodiment of the present invention.

FIG. 9 is a flowchart (activity diagram) showing details of processing operations executed in the fourth embodiment by the application, out of the processing operations in the sequence diagram shown in FIG. 3. As shown in FIG. 9, in a step S901, the application 101 determines whether or not an instruction based on the above-described process start condition has been received from the OS 103. If it is determined in the step S901 that the instruction has been received, the process proceeds to a step S902. On the other hand, if it is determined in the step S901 that the instruction has not been received, the present process is terminated.

In the step S902, the application 101 acquires the information on the network to which the terminal apparatus 100 is connected.

In a step S903, the application 101 refers to the information on the network to which the terminal apparatus 100 was connected last time, which is already stored in the application data storage section 102.

In a step S904, the application 101 compares the network information acquired in the step S902 and the network information acquired in the step S903 and determines whether or not there is a difference between these items of the network information. The application 101 determines, based on a result of this comparison, whether or not there is a difference causing a problem when the terminal apparatus 100 is connected to the peripheral device 110. For example, in a case where the peripheral device 110 is not connected to an access point of the changed network, a problem in connection to the peripheral device 110 is caused. In this case, it is considered that the peripheral device 110 cannot be detected or is difficult to be detected on the network to which the terminal apparatus 100 is connected. Then, as a result of this determination, if it is determined that there is a difference causing such a problem, the process proceeds to a step S905. On the other hand, if it is determined that there is no difference causing such a problem, the present process is terminated.

In the step S905, the application 101 acquires information on the base station 120. Note that in a case where the information on the base station 120 can be acquired in the step S902, the step S905 can be omitted.

In a step S906, the application 101 determines, based on the information acquired in the steps S902, S903, and S905, whether or not the restoration/setting processing can be executed for the peripheral device 110. If it is determined in the step S906 that the restoration/setting processing can be executed, the process proceeds to a step S907. On the other hand, if it is determined in the step S906 that the restoration/setting processing cannot be executed, the present process is terminated.

In the step S907, the application 101 determines what is to be restored/set by the restoration/setting processing.

In a step S908, the application 101 determines information necessary for executing the restoration/setting processing, out of the items of the information acquired in the steps S902 and S905, as transfer information to be passed to the restoration/setting processing (information determination step). Here, the transfer information is not particularly limited but includes, for example, a name, an encryption method, and a frequency band of the network formed by the base station 120 to which the terminal apparatus 100 is connected. Further, the transfer information is defined by the application 101 in advance. In a case where the application 101 receives the transfer information in the restoration/setting processing, the application 101 omits (skips) the other information acquisition processing operations and continues the process based on the received transfer information.

In a step S909, the application 101 generates the guide 500 which is for executing the restoration/setting processing determined in the step S908 and further includes, as internal information, information required to be acquired when executing the restoration/setting processing.

In a step S910, the application 101 displays the guide 500 generated in the step S909 on the screen. Further, the guide 500 can be displayed by using a notification displaying function of the OS 103. In this case, the application 101 temporarily transfers the transfer information to the notification display function of the OS 103 as parameters. After that, the application 101 can be configured to transfer the transfer information again from the notification display function of the OS 103 to the restoration/setting processing of the application 101 or of another application.

In a step S911, the application 101 updates the information on the network to which the terminal apparatus 100 is connected, which is stored in the application data storage section 102, followed by terminating the present process.

As described above, in the present embodiment, the application 101 can acquire the information necessary for execution of the restoration/setting processing (transfer information) in advance and transfer the information to the restoration/setting processing. With this, it is possible to prevent the network setting processing executed by the application 101 for the peripheral device 110, from becoming redundant.

Other Embodiments

Embodiment(s) of the present invention can also be realized by a computer of a system or apparatus that reads out and executes computer executable instructions (e.g., one or more programs) recorded on a storage medium (which can also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer can comprise one or more processors (e.g., central processing unit (CPU), micro processing unit (MPU)) and can include a network of separate computers or separate processors to read out and execute the computer executable instructions. The computer executable instructions can be provided to the computer, for example, from a network or the storage medium. The storage medium can include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-166328 filed Oct. 17, 2022, which is hereby incorporated by reference herein in its entirety.

What is claimed is:

1. A method of controlling a terminal apparatus having a predetermined program, comprising:

acquiring first network information of a base station to which the terminal apparatus is connected at a first timing at which the predetermined program is operating as a background process, and second network information of a base station to which the terminal apparatus was connected at a second timing earlier than the first timing;

determining, based on whether or not the first network information is different from the second network information, by the predetermined program which is operating as the background process, whether or not the terminal apparatus is in a predetermined state in which the terminal apparatus can access a predetermined peripheral device via a network of a base station to which the terminal apparatus is connected; and executing, based on a determination that the terminal apparatus is not in the predetermined state, predetermined processing to place the terminal apparatus in the predetermined state.

2. The method according to claim 1, wherein the predetermined state is a state in which the predetermined peripheral device exists on the network of the base station to which the terminal apparatus is connected.

3. The method according to claim 1, wherein each of the first network information and the second network information includes a service set identifier (SSID) of a base station.

4. The method according to claim 1, further comprising determining, by the predetermined program which is operating as the background process, whether the network of the base station to which the terminal apparatus is connected is a public network or a non-public network, and wherein the predetermined processing is executed in a case where it is determined that the terminal apparatus is not in the predetermined state and also it is determined that the network of the base station to which the terminal apparatus is connected is a public network.

5. The method according to claim 4, wherein in a case where it is determined that the network of the base station to which the terminal apparatus is connected is a non-public network, the predetermined processing is not executed even though the terminal apparatus is not in the predetermined state.

6. The method according to claim 1, wherein the predetermined processing is processing for executing notification to place the terminal apparatus in the predetermined state.

7. The method according to claim 6, wherein the notification is notification inquiring a user about whether to cause the predetermined peripheral device to connect to the base station to which the terminal apparatus is connected.

8. The method according to claim 7, further comprising executing processing to cause the predetermined peripheral device to connect to the base station to which the terminal apparatus is connected, based on execution of a predetermined operation responsive to the notification.

9. The method according to claim 8, wherein the processing to cause the predetermined peripheral device to connect to the base station to which the terminal apparatus is connected is processing to transmit information on the base station to which the terminal apparatus is connected to the predetermined peripheral device.

10. The method according to claim 8, wherein the processing to cause the predetermined peripheral device to connect to the base station to which the terminal apparatus is connected is processing to instruct, from the terminal apparatus, a user how to operate the predetermined peripheral device to connect the predetermined peripheral device to the base station.

11. The method according to claim 7, wherein the notification is executed by using a notification display function of an operating system of the terminal apparatus.

12. The method according to claim 7, wherein the notification is executed by processing executed by the predetermined program which is operating as the background process.

13. The method according to claim 1, wherein the predetermined processing is processing to cause the predetermined peripheral device to connect to the base station to which the terminal apparatus is connected.

14. The method according to claim 1, wherein the processing to cause the predetermined peripheral device to connect to the base station to which the terminal apparatus is connected is processing to transmit information on the base station to which the terminal apparatus is connected, to the predetermined peripheral device.

15. The method according to claim 13, wherein the processing to cause the predetermined peripheral device to connect to the base station to which the terminal apparatus is connected is processing to instruct, from the terminal apparatus, a user how to operate the predetermined peripheral device to connect the predetermined peripheral device to the base station.

16. The method according to claim 1, wherein the predetermined peripheral device is a peripheral device registered in the predetermined program.

17. The method according to claim 1, wherein the predetermined peripheral device is a printer.

18. The method according to claim 17, wherein the determining is further executed periodically on a basis of lapse of time by the predetermined program which is operating as the background process.

19. A terminal apparatus having a predetermined program, comprising:

at least one processor; and at least one memory including at least one program, wherein the at least one program causes the at least one processor to:

acquire first network information of a base station to which the terminal apparatus is connected at a first timing at which the predetermined program is operating as a background process, and second network information of a base station to which the terminal apparatus was connected at a second timing earlier than the first timing;

determine, based on whether or not the first network information is different from the second network information, by the predetermined program which is operating as a background process, whether or not the terminal apparatus is in a predetermined state in which the terminal apparatus can access a predetermined peripheral device via a network of a base station to which the terminal apparatus is connected; and execute, based on a determination that the terminal apparatus is not in the predetermined state, predetermined processing to place the terminal apparatus in the predetermined state.

20. A non-transitory computer-readable storage medium storing a program for causing a computer to execute a method of controlling a terminal apparatus having a predetermined program, wherein the method comprises:

acquiring first network information of a base station to which the terminal apparatus is connected at a first timing at which the predetermined program is operating as a background process, and second network information of a base station to which the terminal apparatus was connected at a second timing earlier than the first timing;

determining, based on whether or not the first network information is different from the second network information, by the predetermined program which is operating as a background process, whether or not the terminal apparatus is in a predetermined state in which the terminal apparatus can access a predetermined peripheral device via a network of a base station to which the terminal apparatus is connected; and executing, based on a determination that the terminal apparatus is not in the predetermined state, predetermined processing to place the terminal apparatus in the predetermined state.

21. The method according to claim 13, further comprising:

storing, in a storage unit of the terminal apparatus, network information on a network to which the predetermined peripheral device is connected; and updating the stored network information with network information on a network to which the predetermined peripheral device is connected in a case where the predetermined processing has been successfully completed.

22. The method according to claim 1, further comprising:

acquiring environment information including position information of the terminal apparatus; and selecting, based on the environment information, the predetermined processing from at least processing to cause the predetermined peripheral device to connect to the base station to which the terminal apparatus is connected and processing to register another peripheral device existing on a network of the base station to which the terminal apparatus is connected as the predetermined peripheral device.

23. The method according to claim 1, further comprising starting the acquiring and the determining in response to at least one of a change in a network to which the terminal apparatus is connected, a change in a position of the terminal apparatus, and a change in an operation state of the terminal apparatus.

24. The method according to claim 1, wherein information used in the determining, including at least the first network information, is passed to the predetermined processing, and the predetermined processing skips acquisition of the information based on the passed information.

* * * * *